No. 810,419. PATENTED JAN. 23, 1906.
G. W. KIRKPATRICK.
ATTACHMENT FOR VEHICLE WHEELS.
APPLICATION FILED FEB. 3, 1904.
2 SHEETS—SHEET 1.
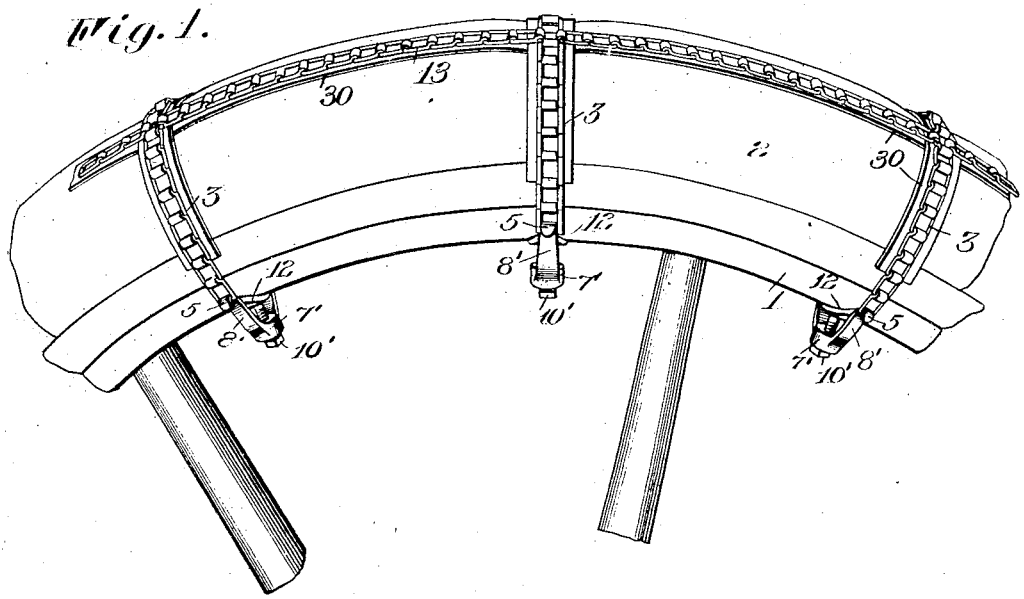
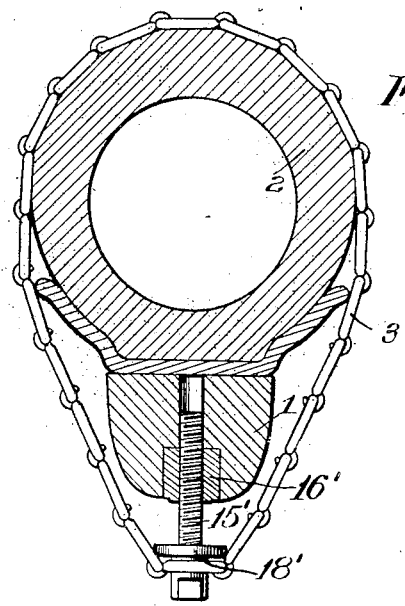

No. 810,419.
PATENTED JAN. 23, 1906.
G. W. KIRKPATRICK.
ATTACHMENT FOR VEHICLE WHEELS.
APPLICATION FILED FEB. 3, 1904.
2 SHEETS—SHEET 2.
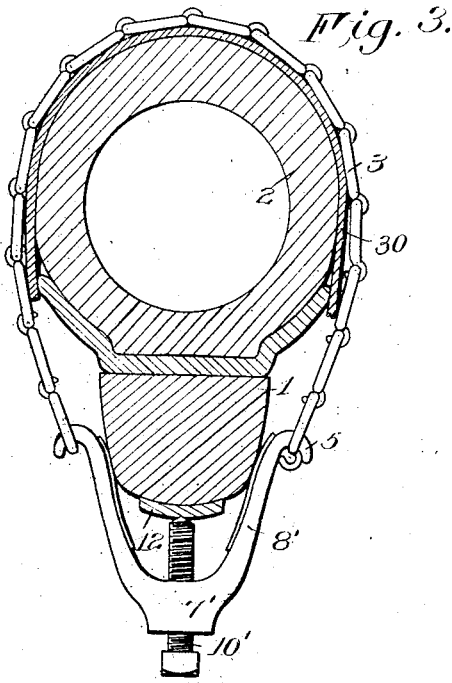
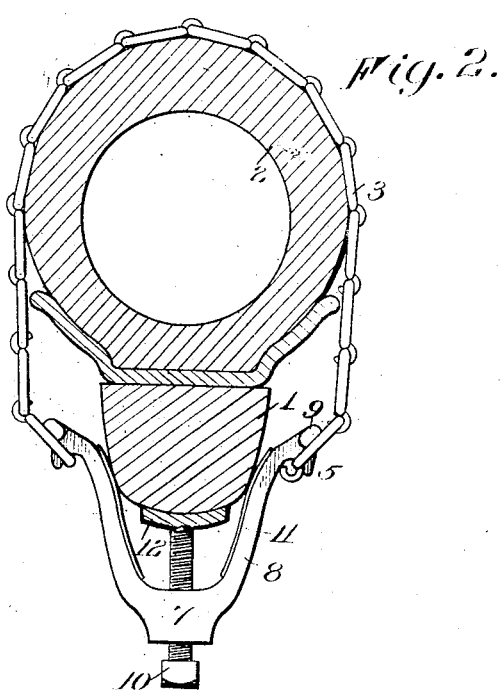
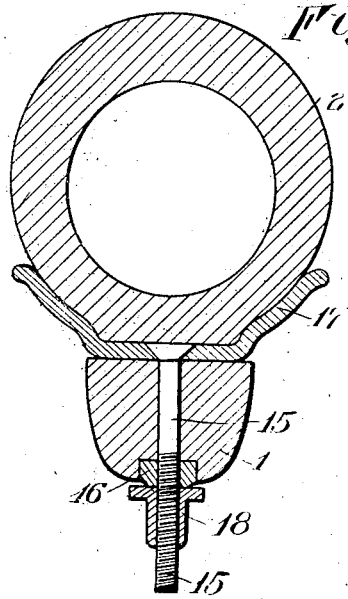
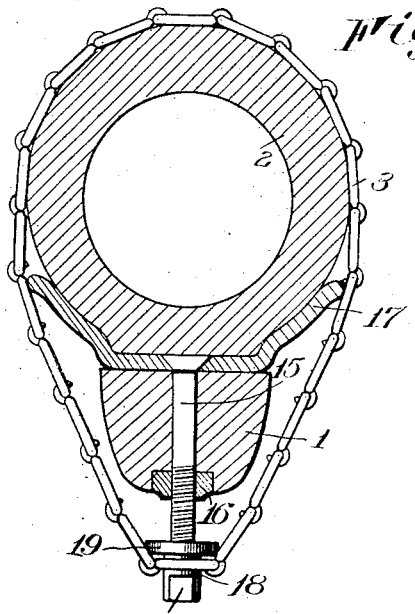
Witnesses
Walter B. Payne
Inventor
George W. Kirkpatrick
By
Attorney

UNITED STATES PATENT OFFICE.

GEORGE W. KIRKPATRICK, OF ROCHESTER, NEW YORK.

ATTACHMENT FOR VEHICLE-WHEELS.

No. 810,419.  Specification of Letters Patent.  Patented Jan. 23, 1906.

Application filed February 3, 1904. Serial No. 191,805.

*To all whom it may concern:*

Be it known that I, GEORGE W. KIRKPATRICK, of Rochester, in the county of Monroe and State of New York, have invented certain new and useful Improvements in Attachments for Vehicle-Wheels; and I do hereby declare the following to be a full, clear, and exact description of the same, reference being had to the accompanying drawings, forming a part of this specification, and to the reference-numerals marked thereon.

My present invention has for its object to provide a device adapted to be employed in connection with vehicle-wheels, and particularly those provided with rubber or pneumatic tires or solid rubber, such as used upon automobiles, whereby the latter may be prevented from slipping or skidding either on snow, muddy road-beds, or on wet or icy pavements.

My present invention has for its further object to provide a device that may be readily applied to and removed from a vehicle-wheel and which when detached will be compact and capable of being confined in a small space.

In the drawings, Figure 1 is a perspective view of the portion of a wheel, illustrating the application of an attachment constructed in accordance with my invention to the rim and tire thereof. Fig. 2 is a cross-sectional view of the wheel-rim, illustrating the attachment in elevation. Fig. 3 is a similar view showing a modified form of yoke or securing device, and Figs. 4, 5, and 6 are views illustrating further modifications thereof.

Similar reference-numerals in the several figures indicate similar parts.

In illustrating my invention I have shown it applied to a vehicle-wheel, only a portion of the rim and the tire thereon being shown, and indicated by 1 and 2, respectively, the latter being shown in the present illustration as a pneumatic tire; but it will be understood that it may be formed solid or otherwise or of a different character without affecting the arrangement of the parts or their operation.

An attachment constructed in accordance with my invention embodies generally bands or cinctures 3, which extend over the outer surface of the rim or tire and are secured thereto by suitable devices engaging the inner side of the rim or felly, which detachably engage one or both the ends of the bands and are movable relatively to the felly, so that the devices may be easily applied to and removed from the wheel. In practice I employ a plurality of these bands or cinctures, spaced equidistant around the rim of the wheel, which are preferably joined by connections 13, extending around the periphery or tread portion of the tire, both the bands and the connections between them being with serrated surfaces adapted to firmly grip the surface of the road-bed as they are carried into engagement therewith by the rotation of the wheel.

The bands or cinctures are preferably formed of short chains composed of flat open links, as shown, the end ones of which are engaged with the upturned or hooked ends 5 of a yoke 7. The latter embodies the diverging arms 8, adapted to extend over the opposite sides of the rim or felly 1, and they are also provided at their outer ends at points beyond the hooks 6 with laterally-extending lugs 9, which are arranged adjacent to said hooks and so located that as the yoke is moved relatively away from this felly by the adjusting screw or bolt 10 to tighten the chain the end links of the latter will act upon said lugs as fulcrums to move the arms 8 toward each other and to hold them firmly in engagement with the opposite sides of the felly, thus serving to hold the yoke firmly in position. To prevent the arms from marring the felly, they are provided upon their inner surfaces with a covering 11, of leather or other suitable material, and a similar covering 30 is also secured to the under sides of bands and the connections between them, so that the surface of the tire is protected from injury. A suitable bearing-plate adapted to engage the rim or felly 1 may be arranged upon the inner end of the screw or bolt 10, as will be understood; but, if desired, such a bearing-plate, as indicated by 12, may be attached permanently to the rim. Usually the bands or chains 3 will be located equidistant from each other, being spaced four to six inches apart, and when so arranged they are sufficient to prevent a wheel from slipping under ordinary conditions; but to increase the traction of the wheel I attach them together by flexible gripping connections 13, also formed of chain-links arranged round the circumference of the tire, the openings in the links and the connections between them forming a rough or serrated surface, which affords a firm grip of the tire upon the road-bed.

In Fig. 3 I have shown a modification of the yoke 7', in which the arms 8' are moved into engagement with the sides of the felly by the strain exerted thereon by the chains acting in straight lines when a tension is placed on the chain when the bolt 10' is operated to move the yoke away from the rim or felly.

As the bands or cinctures may be removably secured to the tire by means other than those described, I have illustrated a different form of straining device, which is shown particularly in Figs. 4 and 5, which embodies the bolt 15, which passes inwardly through the felly of the wheel from the outer side thereof and is secured by a nut 16. With this form of straining device the bolts may be employed for securing the usually metallic rim 17, supporting the tire, the heads thereof being countersunk therein, as shown. Threaded loosely on the bolt 15 is the straining head or nut, having a cylindrical body 18 adapted to pass through one of the links of the chain provided with the annular rim 19, on which said link rests, and for convenience in operation I provide the portion 18 with the flattened sides 20, adapted to facilitate their operation by the application of a wrench or similar instrument. In place of the arrangement of the parts just described the rim or felly may be provided with suitable apertures and the nuts 16' secured in the inner surface thereof in line with said aperture, in which event the straining-head 18' may be formed integrally with the bolt 15', coöperating with the nut 16' to draw or set the band or chain firmly in position on the tire.

A device constructed in accordance with my invention is simple and consists of few parts and is capable of being readily attached to and removed from a vehicle-wheel without alteration in the construction thereof and when not desired for use occupies but small space.

I claim as my invention—

1. The combination with a vehicle-wheel of a flexible band extending over the face of the tire, a device separate from the band and engaging the ends thereof and means for moving it relatively to the rim to tighten the band.

2. The combination with a vehicle-wheel, of a band extending over the tire, a yoke having the arms extending over the rim and detachably engaging the band and means for moving the yoke relatively to the wheel-rim.

3. The combination with a vehicle-wheel of a band extending over the tire, a yoke having spring-arms attached to the ends of the band adapted to engage opposite sides of the rim and means for moving the yoke relatively to the rim.

4. The combination with a vehicle-wheel, of a band extending over the tire, a yoke having arms detachably engaging the ends of the band and a bolt passing through the yoke and engaging the rim.

5. The combination with a vehicle-wheel embodying a rim or felly and a tire, of a band extending over the tire and a yoke having spring-arms adapted to engage opposite sides of the rim or felly, hooks on said arms adapted to receive the ends of said band and a bolt engaging the rim for moving the yoke relatively thereto.

6. The combination with a wheel, embodying a rim or felly and a tire thereon, of a band surrounding the tire, a yoke having spring-arms adapted to receive the ends of the band, projections on the arms coöperating with the band to move the arms relatively toward each other and means for moving the yoke to clamp the band to the tire.

7. The combination with a wheel embodying a rim having a tire thereon and a plurality of chain-bands extending over the tire, of means for securing them in position and chains extending between the bands and arranged over the tread portion of the tire.

GEORGE W. KIRKPATRICK.

Witnesses:
 G. WILLARD RICH,
 RUSSELL B. GRIFFITH.